US005750262A

United States Patent [19]
Gasse et al.

[11] Patent Number: 5,750,262
[45] Date of Patent: May 12, 1998

[54] HEAT-SEALABLE MULTILAYER FILM HAVING GOOD SURFACE SLIP WITH IMPROVED THERMOFORMABILITY BASED ON POLYAMIDE AND POLYOLEFINS

[75] Inventors: Andreas Gasse; Rudi Klein, both of Walsrode, Germany

[73] Assignee: Wolff Walsrode AG, Walsrode, Germany

[21] Appl. No.: 668,558

[22] Filed: Jun. 21, 1996

[30] Foreign Application Priority Data

Jun. 29, 1995 [DE] Germany ............... 195 28 131.4

[51] Int. Cl.$^6$ ............... B32B 27/06; B32B 27/34
[52] U.S. Cl. ............... 428/423.5; 428/424.8; 428/474.7; 428/474.9; 428/475.5
[58] Field of Search ............... 428/423.1, 423.5, 428/424.2, 424.8, 474.4, 474.7, 474.9, 475.5, 500, 521, 522, 523

[56] References Cited

U.S. PATENT DOCUMENTS 4,908,272  3/1990  Harada et al. ............... 428/412
5,039,370  8/1991  Cesaroni ............... 156/326
5,562,996  10/1996  Moriwaki ............... 525/429

FOREIGN PATENT DOCUMENTS 2570088  12/1991  Australia.
0465931  1/1992  European Pat. Off..
0585459  3/1994  European Pat. Off..
0613774  9/1994  European Pat. Off..

*Primary Examiner*—H. Thi Le
*Attorney, Agent, or Firm*—Sprung Kramer Schaefer & Briscoe

[57] ABSTRACT

Heat-sealable composite film having good surface slip with very good thermoforming properties based on polyamide and polyolefins, wherein the film consists of
at least one layer of aliphatic polyamide (A) and
at least one layer of a polymer blend (B) consisting of 10–60 wt. % of amorphous polyamide and 40–90% of aliphatic polyamide and
at least one thermoplastic heat sealing layer (C) and
at least one bonding layer (D),
arranged in such a manner that a heat sealing layer and a layer of aliphatic polyamide are located on the outer sides of the film, and wherein the film is not stretched.

15 Claims, No Drawings

HEAT-SEALABLE MULTILAYER FILM HAVING GOOD SURFACE SLIP WITH IMPROVED THERMOFORMABILITY BASED ON POLYAMIDE AND POLYOLEFINS

The present invention relates to a multilayer film based on polyamide and polyolefins, which is distinguished by particularly good thermoformability with simultaneously good surface slip. Such a film is in particular used for packaging foodstuffs.

BACKGROUND OF THE INVENTION

Combinations of polyamide and polyolefins are traditionally characteristic of flexible thermoforming films used for packaging foodstuffs such as sausage, cheese etc.. In such applications, polyamide is conventionally used as the support material and polyolefins as the material of the heat sealable layer (for example GB 2 023 088). The type of polyamide traditionally used in thermoforming films is predominantly polyamide 6.

At variance with the use of pure polyamide 6, the patent literature makes reference to the use of polyamide blends prepared from amorphous and aliphatic polyamides, for example in stretched films (EP 0 065 278, FR 2 348 805, U.S. Pat. No. 4,800,129). These films have the disadvantage that, due to the stretching (efforts are generally made, for example on grounds of strength and/or cost, to achieve the greatest technically feasible biaxial or monoaxial drawing), they are no longer thermoformable and are therefore fundamentally non-usable for the required applications.

The use of polyamide blends containing aliphatic and amorphous polyamide in thermoformable films is also described. The patent literature makes reference to films which manage with a single layer of such a polyamide blend (EP 0 408 390, AU 8 825 700, EP 0 358 038, JP 1 006 056, DE 2 309 420). Such films are characterised in that, while they are indeed more readily drawable (for example EP 0 408 390, example III, table 3) than polyamide 6 films (polyamide 6 is distinctly more crystalline than a polymer blend containing amorphous polyamide), they have distinctly higher coefficients of friction (Jacobi, H. R., Kunststoffe 47 (1957); Vieweg, R., Müller, A., Kunststoffhandbuch volume IV, C. Hanser Verlag, Munich, 1966, page 540) and thus have poor surface slip.

Films are also known from the patent literature which manage with two layers, wherein one layer consists of a polyamide blend containing aliphatic and amorphous polyamide and another layer consists of heat-sealable material (EP 0 526 814, JP 60 097 850, EP 0 287 839, EP 0 104 436). While, in comparison with the single layer films, these films do indeed have the advantage of being heat-sealable, the problem of poor surface slip nonetheless remains.

In brief, it may be stated that the patent literature contains no reference to films based on polyamide and polyolefins which simultaneously exhibit the properties of good thermoformability, heat-sealability and good surface slip.

The object thus arises of providing a film based on polyamide and polyolefins which simultaneously exhibits the properties
good thermoformability
heat-sealability and
good surface slip.

SUMMARY OF THE INVENTION

Surprisingly, this object could be achieved by means of a heat-sealable composite film having good surface slip with very good thermoforming properties based on polyamide and polyolefins, which is characterised in that the film consists of at least one layer of aliphatic polyamide (A) and at least one layer of a polymer blend (B) consisting of 10–60 wt. % of amorphous polyamide and 40–90% of aliphatic polyamide and at least one thermoplastic heat sealing layer (C) and at least one bonding layer (D), arranged in such a manner that a heat sealing layer and a layer of aliphatic polyamide are located on the outer sides of the film. The film must not be stretched.

DETAILED DESCRIPTION

The polyamide consists of the aliphatic polyamides PA 6, PA 11, PA 12, PA 66, PA 6.66, PA 6.8, PA 6.9, PA 6.10, PA 6.11, PA 6.12, a copolymer prepared from the monomer units contained therein or of a mixture of the stated polyamides.

The amorphous polyamide is a polyamide produced from isophthalic acid and/or terephthalic acid with alkyl-substituted hexamethylenediamine.

The thermoplastic heat sealing layer must have a crystallite melting point of 150° C. or below and originate from the group comprising polyethylenes, polyethylene copolymers, polypropylene, polypropylene copolymers, polybutylenes or ionomers. These are preferably polyethylene (LD, LLD), ethylene/vinyl acetate, ethylene/propylene copolymer, Zn or Na type ionomer, polyisobutylene, poly-1-butene or ethylene/(meth)acrylic acid copolymer.

The bonding layers consist of an adhesive system and/or a polymeric coupling agent. The adhesive system is a 2-component polyurethane adhesive system. The polymeric coupling agent is an anhydride-modified polyethylene, an acid copolymer of ethylene, an acid-modified ethylene vinyl acetate, an acid-modified ethylene (meth)acrylate, anhydride-modified ethylene (meth)acrylate, an anhydride-modified ethylene vinyl acetate, an acid/acrylate-modified ethylene vinyl acetate or a polymer blend containing at least one of the stated coupling agents. The coupling agent is preferably an anhydride-modified polyethylene or polypropylene copolymer.

At least one layer may be provided with lubricants and/or anti-blocking agents, wherein the lubricant is preferably an amide wax and the anti-blocking agent a modified natural silica product. It is particularly worthwhile incorporating lubricants and anti-blocking agents into the heat sealing layer and/or the aliphatic polyamide layer.

Preferred film structures are:
A/D/B/D/C,
A/B/A/D/C or
A/EVOH/B/D/C, wherein EVOH is an ethylene/vinyl alcohol copolymer.

Interlayers may optionally be arranged between layers D and C, which interlayers have good adhesion to D and C and may, for example, be identical to C.

Total film thickness is 15 to 400 µm, preferably 50 to 330 µm.

The film is suitable for printing. At least one layer may be coloured or printed.

The film is in particular suitable for packaging applications, in particular for packaging foodstuffs. The film is suitable for packaging meat and sausage products, milk products, fish and smoked foodstuffs, pre-cooked dishes, bread and bakery goods and medical devices.

It has surprisingly proved possible by means of the composition of the film according to the invention to satisfy the requirement for good surface slip while simultaneously achieving good thermoformability. It is known from the prior art that, in comparison with aliphatic polyamides, polyamide blends containing aromatic polyamide are somewhat more readily thermoformable; such blends are, however, characterised by poor surface slip (see above, prior art). It could thus be expected in the combination according to the invention of both layers that opposing effects would result in moderate thermoformability. Surprisingly, however, still better thermoformability with good surface slip are achieved.

Production processes which may be considered for the film are coextrusion (blown film or flat film) or also individual production of layers A, B and C, which are then laminated together (layer D). Combined processes are also conceivable.

Known, conventional prior art plant designs are used, wherein in the case of blown film coextrusion the production process is characterised in that the melt is shaped into a film bubble, inflated, cooled and the other, now cool, end is flattened by pinch rolls and held closed and the film then wound. In the case of flat film coextrusion, so-called chill roll units are used, which have the particular feature of large cooling rolls which receive the molten film leaving the die.

The units to be used are fundamentally different from so-called stretching units, which cannot be used for the film of the present invention since they always produce a stretched product.

The following combined processes are particularly economically viable:

flat film coextrusion of a support with the structure A/D/B/D and subsequent extrusion or coextrusion coating of layer C, optionally with interlayer(s) between D and C.

flat film coextrusion of support A/EVOH/B, application of an adhesive D and subsequent lamination of a heat sealing layer C previously produced as a blown film, optionally with interlayer(s) between D and C.

flat film coextrusion of support A/B/A, application of an adhesive D and subsequent lamination of a heat sealing layer C previously produced as a blown film, optionally with interlayer(s) between D and C.

Thermoformability was used as a feature for evaluation of the invention. In order to determine thermoformability, the previously produced film samples were tested in modern automatic thermoforming machines as are used in the packaging industry (for example Tiromat, Multivac). To this end, the film webs clamped in the machine were heated in sections by a hot plate. Heating may be performed to this end either from the sealing side or also from the opposite side to the sealing side. The films preheated at hot plate temperatures of 90° C. were then thermoformed into a tray of edge dimensions 185×115 mm. By increasing the depth of draw in 5 mm steps, the maximum depth of draw to which the particular films could be thermoformed without defects was determined.

The frictional behaviour of the films (opposite side to sealing side) against metal was also determined. The coefficient of static friction to DIN 53 375 was measured. A test apparatus (VNNG) from Otto Brugger, Munich was used for this purpose. The measurement conditions were:

| | |
|---|---|
| test strip: | 800 mm × 200 mm |
| test table: | polished steel |
| sled: | mass 200 g, test surface 63 mm × 64 mm |
| take-off speed: | 100 mm/min |
| test distance: | >60 mm |
| force measurement: | electronic |

Puncture tests to DIN 53 373 were also performed. To this end, film samples of a diameter of 80 mm were cut from the finished film webs with a circle cutter. The puncture test was performed at an impact velocity of 4.5 m/sec with a Dynatester. The direction of puncture is here perpendicular to the surface of the clamped sample. Table 1 shows the puncture force in [N] determined using this method.

The elongation at break values shown in table 1 were measured by tensile testing. To this end, specimens of a width of 15 mm (clamping distance 100 mm, test speed 100 mm/min) were subjected to tensile force until break. Elongation at break is then the elongation of the specimens at break in [%]. A computer-controlled tensile tester was used.

EXAMPLES & COMPARATIVE EXAMPLES

The following examples are intended to illustrate the subject matter of the invention. Stretched films have not been examined since it is well-known to those skilled in the art that such films are not thermoformable.

A. EXAMPLE 1

Multilayer non-stretched film with the structure

PA 6/HV/(70% PA 6 + 30% aPA)/HV/PE
35/10/35/10/55 µm

The five-layer film was coextruded as a flat film. Total thickness is 145 µm. The PA 6 was a polyamide 6 of a density of 1140 kg/m$^3$ with a crystallite melting point of 219° C. and a relative solution viscosity of 3.8 (PA concentration 1%, temperature 25° C., measured in m-cresol), the aPA used was an amorphous polyamide based on isophthalic acid and terephthalic acid of a density of 1190 kg/m$^3$ and a glass transition temperature of 127° C., the HV used was a maleic anhydride grafted linear low density polyethylene of a density of 910 kg/m$^3$ with a crystallite melting point of 125° C. and a melt flow index (MFI 190/2.16) of 4.0 g/10 min and the PE used was a copolymer of ethylene and octene (LLDPE) of a density of 935 kg/m$^3$ and a crystallite melting point of 126° C. and a melt flow index (MFI 190/2.16) of 4.4 g/10 min.

B. EXAMPLE 2

Multilayer non-stretched film with the structure

PA 6/HV/(70% PA 6 + 30% aPA)/HV/PE
30/10/30/10/55 µm

Production and polymers as in example 1.

C. EXAMPLE 3

Multilayer non-stretched film with the structure

PA 6/HV/(85% PA 6 + 15% aPA)/HV/PE
35/10/35/10/55 µm

Production and polymers as in example 1.

D. COMPARATIVE EXAMPLE 1

Multilayer non-stretched film with the structure

PA 6/HV/PA 6/HV/PE
35/10/35/10/55 µm

Production and polymers as in example 1.

E. COMPARATIVE EXAMPLE 2

Multilayer non-stretched film with the structure

PA 6/HV/(20% PA 6 + 80% aPA)/HV/PE
25/10/25/10/55 μm

Production and polymers as in example 1.

F. COMPARATIVE EXAMPLE 3

Multilayer non-stretched film with the structure (85% PA 6 + 15% aPA)/HV/(85% PA 6 + 15% aPA)/HV/PE
35/10/35/10/55 μm Production and polymers as in example 1.

Table 1 shows the thermoformability rating (by means of maximum depth of draw and elongation at break), frictional behaviour (by means of coefficient of static friction) and mechanical strength (by means of puncture force) of the described films A, B, C, D, E and F. Testing was performed as described above.

TABLE 1

Frictional behaviour, thermoformability and mechanical strength.

| | | Film structure | Coefficient of static friction [—] | Elongation at break [%] | Maximum depth of draw [mm] | Puncture force [N] |
|---|---|---|---|---|---|---|
| A | Example 1 | according to the invention | 0.13 | 626 | 85 | 280 |
| B | Example 2 | according to the invention | 0.16 | 586 | 85 | 300 |
| C | Example 3 | according to the invention | 0.16 | 689 | 80 | 280 |
| D | Comparative Example 1 | polymer blend absent | 0.14 | 447 | 70 | 260 |
| E | Comparative Example 2 | excessive aPA in polymer blend | 0.16 | 461 | 65 | 200 |
| F | Comparative Example 3 | PA 6 layer absent | 0.52 | 677 | 85 | 260 |

As may be seen from table 1, good coefficients of friction (distinctly <0.20) with simultaneously good thermoformability (in this case maximum depth of draw ≧80 mm, elongation at break >580%) are achieved as desired in films A, B and C produced according to the invention. The films produced according to the invention moreover exhibit elevated mechanical strength, as is shown by the puncture force measurement (≧280N).

In film D, which was not produced according to the invention, the polyamide blend layer was omitted and, while good frictional values are achieved, the film has poor thermoforming properties (in this case maximum depth of draw ≦70 mm, elongation at break ≦470%) and has low mechanical strength (puncture force ≦260N). A similar assessment applies to film E, which has an excessively high proportion of amorphous polyamide in the polyamide blend. The outer PA 6 layer is absent in film F. While adequate thermoformability is indeed achieved in this case, the film is very dull (coefficient of static friction 0.52) and is of low mechanical strength.

We claim:

1. A heat-sealable composite film comprising at least one layer of aliphatic polyamide (A) and at least one layer of a polymer blend (B) consisting of 10–60 wt. % of amorphous polyamide and 40–90% of aliphatic polyamide and at least one thermoplastic heat sealing layer (C) having a crystallite melting point of 150° C. or below and being selected from the group consisting of polyethylenes, polyethylene copolymers, polypropylene, polypropylene copolymers, polybutylenes and ionomers, and at least one bonding layer (D), arranged in such a manner that a heat sealing layer and a layer of aliphatic polyamide are located on the outer sides of the film, and in that the film is not stretched.

2. The film according to claim 1, wherein the aliphatic polyamide is PA 6, PA 11, PA 12, PA 66, PA 6,66; PA 6,8; PA 6,9; PA 6,10; PA 6,11; PA 6,12; a copolymer prepared from the monomer units contained therein or of a mixture of the stated polyamides.

3. The film according to claim 1, wherein the amorphous polyamide is a polyamide produced from isophthalic acid and/or terephthalic acid with alkyl-substituted hexamethylenediamine.

4. The film according to claim 1, wherein the thermoplastic sealing layer is polyethylene (LD, LLD), ethylene/vinyl acetate copolymer, ethylene/propylene copolymer, Zn or Na ionomer, polyisobutylene, poly-1-butene or ethylene/(meth) acrylic acid copolymer or a blend thereof.

5. The film according to claim 4, wherein said at least one bonding layer consists of an adhesive system and/or a polymeric coupling agent.

6. The film according to claim 5, wherein said adhesive system is a 2-component polyurethane adhesive system.

7. The film according to claim 5, wherein the polymeric coupling agent is polypropylene copolymer, an anhydride-modified polyethylene, an acid copolymer of ethylene, an acid-modified ethylene vinyl acetate copolymer, an acid-modified ethylene(meth)acrylate copolymer, anhydride-modified ethylene (meth)acrylate, an anhydride-modified ethylene vinyl acetate, an acid/acrylate-modified ethylene vinyl acetate copolymer or a polymer blend thereof.

8. The film according to claim 7, wherein the coupling agent is an anhydride-modified polyethylene or polypropylene copolymer.

9. The film according to claim 1, wherein at least one layer is provided with lubricants and/or anti-blocking agents.

10. The film according to claim 1, wherein the heat sealing layer and/or the aliphatic polyamide layer are provided with lubricants and/or anti-blocking agents.

11. The film according to claim 10, wherein the lubricant is an amide wax.

12. The film according to claim 1, wherein the film has the structure A/D/B/D/C or A/B/A/D/C or A/EVOH/B/D/C, wherein EVOH is an ethylene/vinyl alcohol copolymer and there are optionally interlayers between layers D and C.

13. The film according to claim 1, wherein the total thickness of the film is 15 to 400 µm.

14. A package enclosed in a film according to claim 1.

15. A foodstuff enclosed in a film according to claim 1.

* * * * *